US007990877B2

(12) United States Patent
Lu

(10) Patent No.: US 7,990,877 B2
(45) Date of Patent: Aug. 2, 2011

(54) METHOD AND APPARATUS FOR DYNAMICALLY RUNTIME ADJUSTABLE PATH COMPUTATION

(75) Inventor: Wenhu Lu, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 353 days.

(21) Appl. No.: 12/121,601

(22) Filed: May 15, 2008

(65) Prior Publication Data

US 2009/0285101 A1    Nov. 19, 2009

(51) Int. Cl.
*H04L 12/26* (2006.01)
(52) U.S. Cl. .................................. 370/238; 370/395.21
(58) Field of Classification Search .................. 370/238, 370/395.21
See application file for complete search history.

(56) References Cited

U.S. PATENT DOCUMENTS

| | | | | |
|---|---|---|---|---|
| 6,301,244 | B1 * | 10/2001 | Huang et al. | 370/351 |
| 6,956,821 | B2 * | 10/2005 | Szviatovszki et al. | 370/237 |
| 7,324,453 | B2 | 1/2008 | Wu et al. | |
| 2003/0118024 | A1 * | 6/2003 | Lee et al. | 370/395.1 |
| 2007/0280117 | A1 * | 12/2007 | Katz et al. | 370/238 |

OTHER PUBLICATIONS

Arshad, Muhammad Taimur, "Routing Traffic Reliably (RTR) A CSPF Algorithm," Mar. 26, 2003, 8 pages.
Liu, Gang and Ramakrishnan, K.G., "A*Prune: An Algorithm for Finding K Shortest Paths Subject to Multiple Constraints," IEEE INFOCOM 2001, 0-7803-7016-3/01 © 2001 IEEE, pp. 743-749.
Jabbari, Bijan, et al., "On Constraints for Path Computation in Multi-layer Switched Networks," IEICE Trans. Commun., vol. Exx-B, No. xx XXXX 200x, Final manuscript received Mar. 9, 2007, pp. 1-6.
"Information Technology—Telecommunications and Information Exchange between Systems—Intermediate System to Intermediate System Intra-domain Routeing Information Exchange Protocol for use in Conjunction with the Protocol for Providing the Connection-less-mode Network Service (ISO 8473)," International Standard, ISO/IEC 10589, Second Edition, Nov. 15, 2002, Reference No. ISO/IEC 10589:2002(E), Geneva, Switzerland, pp. 1-210.
"Implementing a Constraint-based Shortest Path First Algorithm in Intelligent Optical Networks," MAHI Networks, Copyright © 2003 Mahi Networks, Inc., pp. 1-11.
Farrel, A., et al., "A Path Computation Element (PCE)-Based Architecture," Request for Comments (RFC) 4655, Aug. 2006, pp. 1-40.
Moy, J., "OSPF Version 2," Request for Comments: 2328, Apr. 1998, pp. 1-244.

* cited by examiner

*Primary Examiner* — Huy D Vu
*Assistant Examiner* — Benjamin Lamont
(74) *Attorney, Agent, or Firm* — Blakely, Sokoloff, Taylor & Zafman LLP

(57) ABSTRACT

A method and apparatus for performing a dynamically runtime adjustable constrained shortest path first (CSPF) computation of a label switched path (LSP) is described. In one embodiment of the invention, a network element acting as a source of the LSP receives a request to compute the LSP which includes one or more traffic engineering constraints. If the request includes at least one additive constraint, the network element performs a CSPF calculation. If the request does not include an additive constraint, the network element prunes each link that does not satisfy each of the constraints, and prunes those links whose paths converge at an intermediary network element according to cost, calculates a path to the destination according to cost. Other methods and apparatuses are also described.

24 Claims, 5 Drawing Sheets

| NETWORK ELEMENT ID 502 | TO NETWORK ELEMENT ID 504 | COST 506 | BANDWIDTH 508 | LINK COLOR 510 |
|---|---|---|---|---|
| NETWORK ELEMENT 100 | NETWORK ELEMENT 404 | 5 | 150 | GOLD |
| NETWORK ELEMENT 100 | NETWORK ELEMENT 402 | 2 | 100 | SILVER |
| NETWORK ELEMENT 402 | NETWORK ELEMENT 406 | 1 | 100 | SILVER |
| NETWORK ELEMENT 404 | NETWORK ELEMENT 406 | 3 | 100 | GOLD |
| NETWORK ELEMENT 406 | NETWORK ELEMENT 407 | 3 | 75 | SILVER |
| NETWORK ELEMENT 406 | NETWORK ELEMENT 408 | 1 | 100 | GOLD |
| NETWORK ELEMENT 406 | NETWORK ELEMENT 409 | 1 | 115 | BRONZE |
| NETWORK ELEMENT 407 | NETWORK ELEMENT 410 | 2 | 75 | SILVER |
| NETWORK ELEMENT 408 | NETWORK ELEMENT 410 | 2 | 100 | GOLD |
| NETWORK ELEMENT 409 | NETWORK ELEMENT 411 | 1 | 115 | BRONZE |
| NETWORK ELEMENT 411 | NETWORK ELEMENT 410 | 1 | 115 | BRONZE |

TE DATA STRUCTURE 116

FIG. 5

METHOD AND APPARATUS FOR DYNAMICALLY RUNTIME ADJUSTABLE PATH COMPUTATION

BACKGROUND

1. Field

Embodiments of the invention relate to the field of networking; and more specifically, to computing a constraint based path.

2. Background

Constraint based path computation processes paths based on one or more constraints. For example, a network administrator may use constraint based path computation to select a path from a source to a destination based on one or more constraints. Generally, there are two types of constraints; Boolean constraints (e.g., cost of a link, available bandwidth of the link, link color, etc.) and additive constraints (e.g., number of hops limit). A Boolean constraint is a link type constraint (e.g., one hop type constraint) that requires a specific value for that link to be satisfied. Thus, evaluating whether a link satisfies a Boolean constraint depends only on that link. For example, for a link to satisfy an available bandwidth Boolean constraint (e.g., links must have an available bandwidth of 50), that link must meet or exceed the available bandwidth constraint. Thus, evaluating a Boolean constraint results in a value of True (link satisfies the constraint) or False (link does not satisfy the constraint). In contrast, an additive constraint is a path type constraint that is calculated on the basis of all the links in the path (e.g., multiple hops from the source to the destination). Thus, evaluating whether a path satisfies an additive constraint depends upon each link in the path (e.g., link characteristics of each link of the path are added and compared against the additive constraint). For example, for a path to satisfy a hop limit additive constraint (e.g., 3 hops or less), the number of hops (e.g., each link of the path) is added and compared against the hop limit additive constraint.

The characteristics of the links (e.g., cost, bandwidth, color, etc.) are propagated throughout the network using link-state routing protocols (e.g., Open Shortest Path First (OSPF) (described in Request For Comments (RFC) 2328, "OSPF Version 2", April 1998), Intermediate System to Intermediate System (IS-IS) (described in International Standard ISO/IEC 10589:2002E, Nov. 15, 2002)). Typically these characteristics are stored in a traffic engineering database on each network element in the network. Thus, the traffic engineering database stores a representation of the topology of the network. A network element receives a service request for a path to a destination (thus the network element is the source) with one or more constraints (e.g., a network administrator, using a command line interface (CLI), requests a path to a destination given one or more constraints). The network element computes the requested path based on the constraints and the information in the traffic engineering database.

Several algorithms have been developed for computing constraint based paths. For example, several Constrained Shortest Path First (CSPF) algorithms have been developed. While no standard algorithm exists, a CSPF algorithm typically disregards those links from the network topology that do not meet the constraints and then performs a Shortest Path First (SPF) algorithm (e.g., a Dijkstra algorithm) on the remaining links. For example, all links that do not meet a given bandwidth constraint are disregarded and a SPF algorithm is performed on the remaining links to determine a path. It should be understood, however, that determining whether links meet the constraints is computationally expensive.

BRIEF DESCRIPTION OF THE DRAWINGS

The invention may best be understood by referring to the following description and accompanying drawings that are used to illustrate embodiments of the invention. In the drawings:

FIG. 5 is an exemplary traffic engineering data structure representing the topology of the MPLS network of FIG. 4 according to one embodiment of the invention

DETAILED DESCRIPTION

Figure 1:
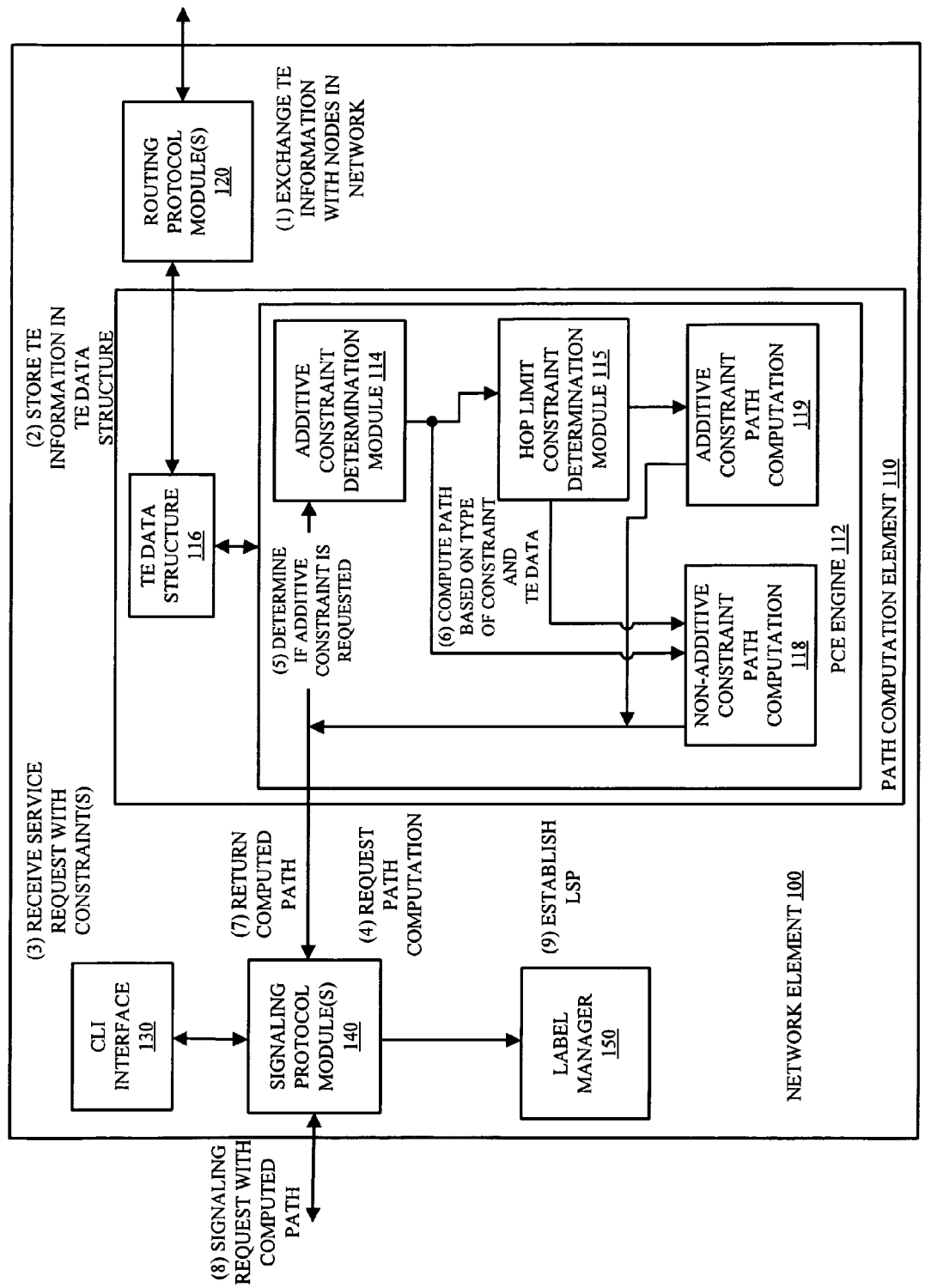
FIG. 1 is a data flow diagram illustrating an exemplary network element performing a dynamically runtime adjustable constrained shortest path first computation for a requested path with one or more constraints according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network, wirelessly to an access network) to edge network elements, which are coupled through core network elements of the Internet to the server computing end stations.

Some network elements support the configuration of multiple contexts. As used herein, each context is an instance of a virtual network element (e.g., a virtual router or a virtual bridge). Each context typically shares one or more computing resources (e.g., memory, processing cycles, etc.) with other contexts configured on the network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es).

FIG. 1 is a data flow diagram illustrating an exemplary network element performing a dynamically runtime adjustable constrained shortest path first computation for a requested path with one or more constraints according to one embodiment of the invention. The operations of FIG. 1 will be described with the exemplary embodiment of FIG. 4. However, it should be understood that the operations of FIG. 1 can be performed by embodiments of the invention other than those discussed with reference to FIG. 4, and the embodiments discussed with reference to FIG. 4 can be performed differently than those discussed with reference to FIG. 1. The network element 100 includes a path computation element (PCE) 110, routing protocol module(s) 120, command line interface (CLI) 130, signaling protocol module(s) 140, and label manager 150. The PCE 110 includes a PCE engine 112 coupled with a traffic engineering (TE) data structure 116. The PCE engine 112 includes the additive constraint determination module 114, the hop limit constraint determination module 115, the non-additive constraint path computation module 118 and the additive constraint path computation module 119.

Figure 4:
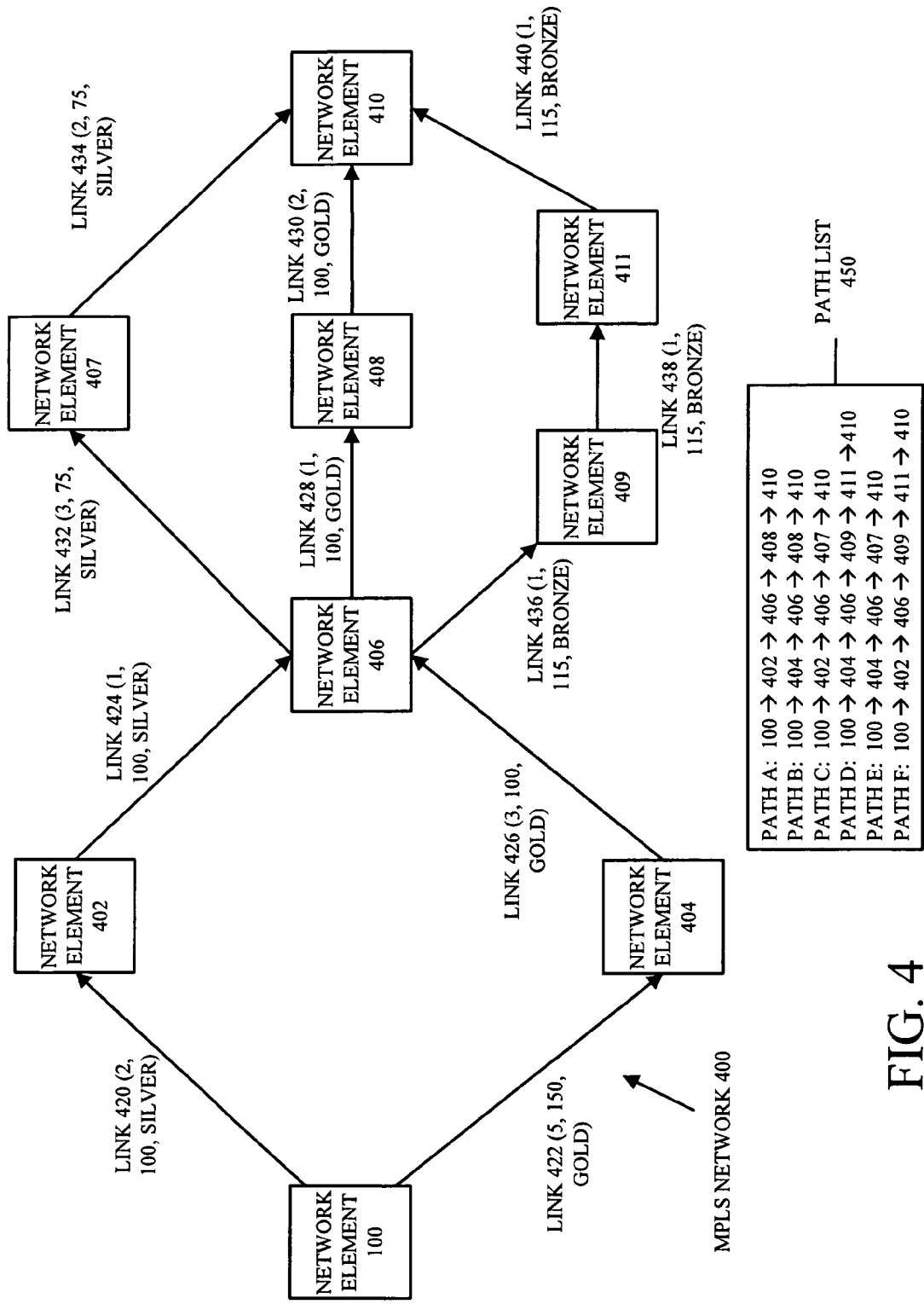
FIG. 4 illustrates an exemplary Multiprotocol Label Switching (MPLS) network according to one embodiment of the invention.
Figure 3:
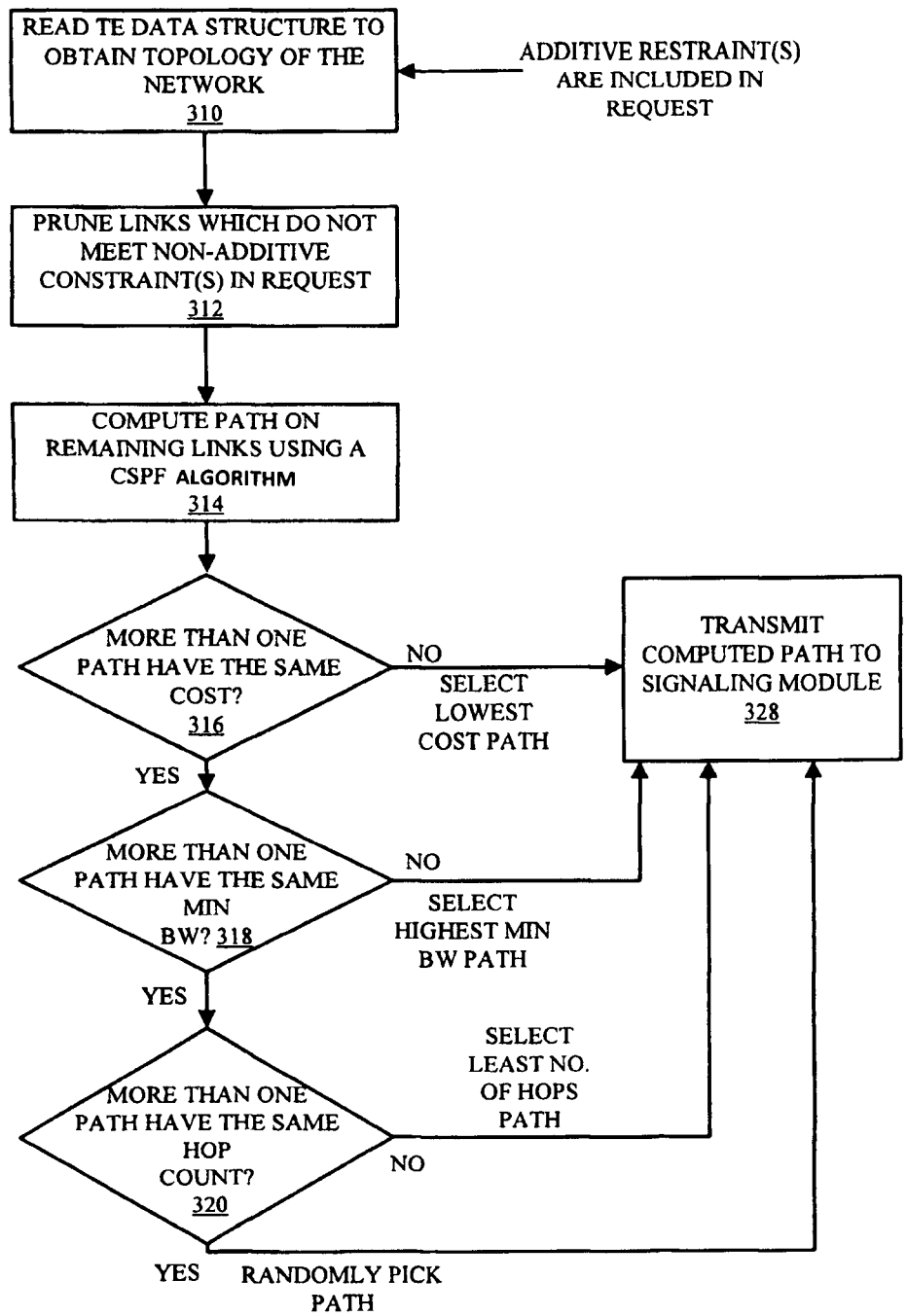

According to one embodiment of the invention, the network element 100 is one of a plurality of network elements in the MPLS network 400 of FIG. 4, and is a source of a label switched path (LSP) (e.g., the network element 100 is an ingress Label Edge Router (LER), or sometimes called a headend router). In the exemplary embodiment of FIG. 4, the network element 100 is a source of an LSP (e.g., the network element 100 computes the LSP and is the beginning of the LSP) to the network element 410 which is the destination of the LSP (thus, e.g., the network element 410 is an egress LER, or sometimes called a tailend router). The MPLS network 400 also includes the network elements 402, 404, 406, 407, 408, 409, 410, and 411, which are each intermediate network elements (e.g., Label Switch Routers (LSRs)). Any path from the network element 100 to the network element 410 must go through at least one intermediate network element. For example, in the exemplary embodiment of FIG. 4, there are a total of six paths from the network element 100 to the network element 410 (illustrated in the path list 450). It should be understood that the path list 450 is for explanation purposes and is not computed by the network element 100. Of course, it should be understood that each path is not equivalent (e.g., each link has its own characteristics).

The network element 100 exchanges traffic engineering information with the other network elements in the network with use of the routing protocol module(s) 120. For example, the routing protocol module(s) 120 includes link state routing protocols (e.g., OSPF, IS-IS) to exchange traffic engineering information. Thus, at an operation 1, the network element 100 uses its routing protocol module(s) 120 to exchange traffic engineering information with the network elements in the MPLS network 400. From each network element in the MPLS network 400, the network element 100 may receive traffic engineering information including a list of that network element's neighbors, network resource information (e.g., characteristics of the links (e.g., available bandwidth, maximum bandwidth, link color, etc.)), etc. For example, the network element 404 may exchange information with the network element 100 indicating that the link 420 has a cost of 2, a maximum bandwidth of 100, and a link color of Silver.

At operation 2, the network element 100 stores the received traffic engineering information in the traffic engineering data structure 116. The traffic engineering data structure 116 can take a variety of forms in different embodiments of the invention, including a database, list, tree, trie, table, etc. According to one embodiment of the invention, the data in the traffic engineering data structure 116 collectively forms a topology of the MPLS network 400 which includes the linking of the network elements and the characteristics of those links. For example, FIG. 5 is an exemplary traffic engineering data structure 116 representing the topology of the MPLS network 400 according to one embodiment of the invention. In the exemplary traffic engineering data structure 116 illustrated in FIG. 5, the network element identifier 502 column identifies the network element that is a starting point for the link, the network element identifier 504 column identifies the network element that is the destination for the link, the cost 506 column indicates the cost (e.g., delay) of the link, the bandwidth 508 column indicates the bandwidth of the link, and the link color 510 indicates the link color (e.g., administrative groups) of that link. For example, the link 422 illustrated in FIG. 4 is represented in the first entry of the traffic engineering data structure 116. It should be understood that the exemplary traffic engineering data structure illustrated in FIG. 5 is for illustrative purposes and does not include other information for each link (e.g., IP address, type, user-defined attributes (e.g., affinity), etc.).

Sometime later, at operation 3, the network element 100 receives an LSP service request with one or more constraints. According to one embodiment of the invention, this request is received at the signaling protocol module(s) 140 (e.g., RSVP, LDP) via the command line interface 130 (e.g., the service request is converted into a signaling request). For example, a network administrator may request an LSP with one or more constraints via the command line interface 130. Since the request contains at least one constraint, a constrained path computation is necessary, and thus at operation 4 requests path computation. While in one embodiment of the invention the signaling protocol module(s) 140 interprets the request to determine if at least one constraint is included in the request, in alternative embodiments of the invention a separate module (not shown in FIG. 1) interprets the request to determine if a constraint is included in the request.

As previously described, constraints generally can be categorized into Boolean constraints and additive constraints. In typical path computation elements, a single computational algorithm is used to calculate path those requests that include an additive constraint and those that do not include an additive constraint. For example, if a path request includes only one or more Boolean constraints (and thus no additive constraints), typical path computation elements compute the path using the same computational algorithm as if additive constraints were included in the request (e.g., the algorithm must account for the possibility of additive constraints in the request). Thus, typical path computation elements do not make a distinction between processing a request that does not include an additive constraint and processing a request that includes an additive constraint. For example, regardless if an additive constraint is included in the request, a typical path computation element does not eliminate tentative links until the entire path is calculated (i.e., until the path to the destination has been completed), which may not be necessary for computing a path if the request does not include at least one additive constraint. Thus, it should be understood that if the request does not include an additive constraint, typical path computation elements take a longer time, and use more resources (e.g., processing cycles, memory, etc.), than is necessary to calculate the path. It should be understood that the amount of time and resources necessary for a typical path computation element to calculate a path exponentially increases as the size of the network increases.

At operation 5, the additive constraint determination module 114 determines whether an additive constraint is included in the request. If the request does not include an additive constraint (i.e., only one or more Boolean constraints are in the request), at operation 6 the non-additive constraint path computation module 118 performs the path computation based on the traffic engineering data. An exemplary non-additive constraint path computation 118 module will be described in greater detail with regards to FIG. 2. If the request includes an additive constraint (e.g., zero or more Boolean constraints with at least one additive constraint), then the hop limit constraint determination module 115 determines whether a hop limit constraint can be excluded from analysis. For example, the greatest number of hops in a given topology (e.g., topology with 15 nodes (network elements)) is the number of nodes minus one (e.g., 14 hops). If the hop limit constraint is greater than the number of nodes in the topology, that hop limit constraint will be met by every possible path to the destination. Thus, that hop limit constraint need not be analyzed further (i.e., it can effectively be excluded from further consideration). Therefore, if a hop limit constraint can be excluded by the hop limit constraint determination module 115, the hop limit determination module 115 converts the request into a non-additive path request and at operation 6 the non-additive constraint path computation module 118 performs the path computation based on the traffic engineering data. However, if there are additional additive constraints which cannot be excluded and/or a hop limit constraint that cannot be excluded by the hop limit constraint determination module 115, at operation 6 the additive constraint path computation module 119 performs the path computation based on the traffic engineering data. An exemplary additive constraint path computation module 119 will be described in greater detail with regards to FIG. 3.

Figure 2:
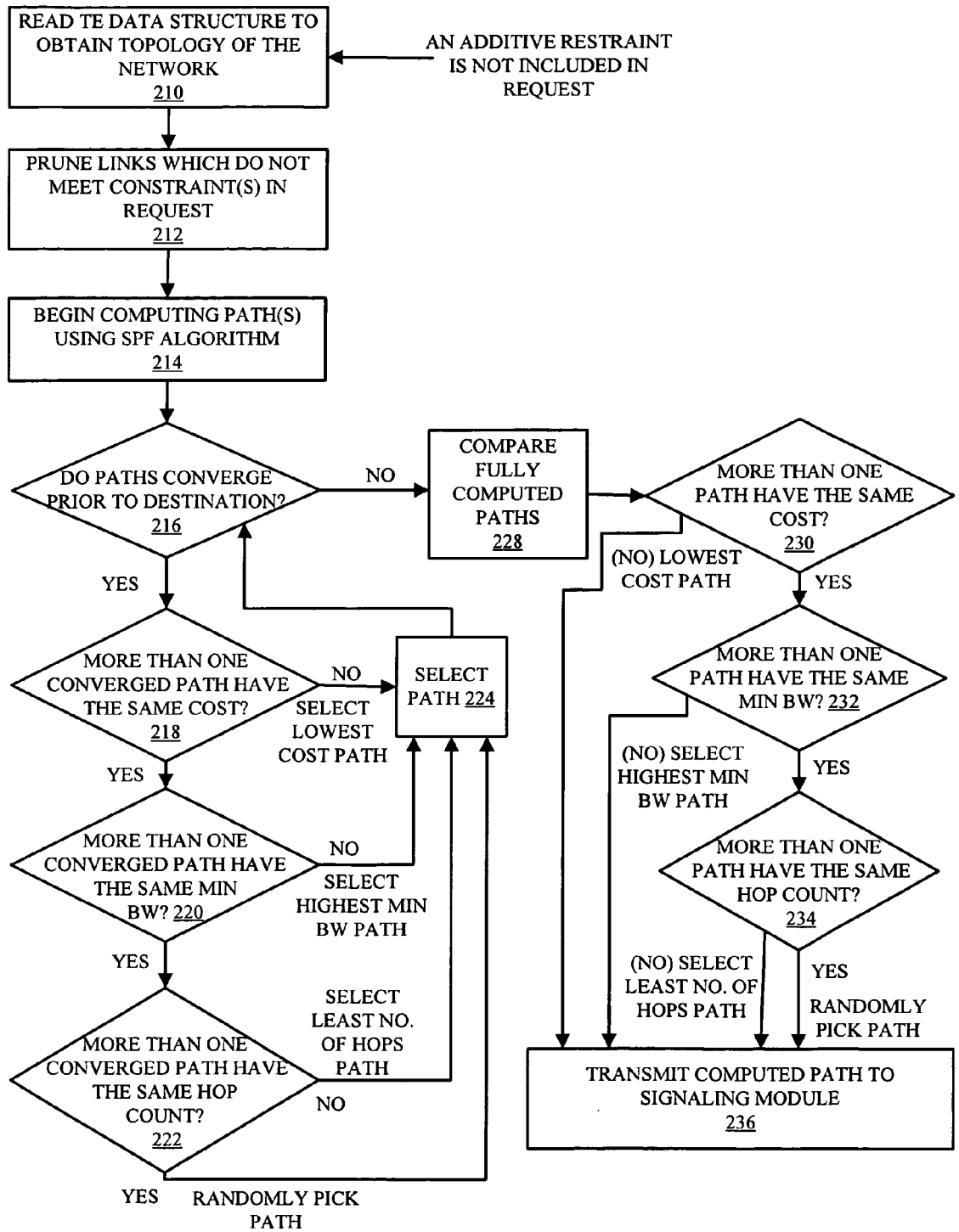
FIG. 2 is a flow diagram illustrating computing a path for the LSP upon determining that the request does not include an additive constraint according to one embodiment of the invention.

FIG. 2 is a flow diagram illustrating computing a path upon determining that the request for the path does not include an additive constraint according to one embodiment of the invention. The operations of the FIG. 2 will be described with reference to the exemplary embodiment of FIG. 4. However, it should be understood that the operations of FIG. 2 can be performed by embodiments of the invention other than those discussed with reference to FIG. 4, and the embodiments discussed with reference to FIG. 4 can perform operations different than those discussed with reference to FIG. 2. At block 210, sometime after determining that the request does not include an additive constraint, the non-additive constraint path computation module 118 reads the traffic engineering data structure 162 to obtain the topology of the network. Thus, according to one embodiment of the invention, the exemplary algorithm illustrated in FIG. 2 is performed by the PCE engine 112 if the request does not include an additive constraint (i.e., the request only includes one or more Boolean constraints). According to one embodiment of the invention, the PCE engine 112 causes the data in the traffic engineering data structure to be entered into a cache memory of the network element 100, and performs the path computation based on that data and the requested constraint(s).

Flow passes from block 210 to block 212. At block 212, the links which do not meet the constraints (e.g., the Boolean constraints) are pruned from the topology (e.g., the links are removed from consideration of the path). For example, referring to FIG. 4, if the request is for a path from the network element 100 to the network element 410 with at least a bandwidth of 100, the links which do not meet the bandwidth constraint are pruned (e.g., links 432 and 434, which each have a bandwidth of 75, are pruned). Thus, it should be understood that if a Boolean constraint of a minimum bandwidth of at least 100 is received, then in the exemplary configuration of FIG. 4, paths C and E are removed from consideration and cannot be selected since those paths include links which are pruned.

Flow passes from block 212 to block 214, where the PCE engine 112 begins computing tentative paths using a shortest path first (SPF) algorithm (e.g., Dijkstra's algorithm) on those links which have not been pruned. Flow passes from block 214 to block 216. Typically, the shortest path first algorithm selects routes based on the shortest path (e.g., the cost of the path).

According to one embodiment of the invention, the non-additive constraint path computation module 118 prunes tentative paths as early as possible in path computation. In other words, the non-additive constraint path computation module 118 may prune tentative paths before reaching the final stage of node expansion (i.e., before reaching the target node, the destination). For example, the paths A, B, D, and F each go though the network element 406 (the paths C and E also go through the network element 406 but they are not considered since the links 432 and 434 were pruned for failing to meet the Boolean constraint). Paths A and F go through the network element 406 via the network element 402 (with a cost of 3). Paths B and D go through the network element 406 via the network element 404 (with a cost of 8). Thus, the paths A and F will always have a smaller cost than those of paths B and D (and thus there is no need to calculate the costs of the rest of paths B and D). Thus, the non-additive constraint path computation module 118 may safely prune the links 422 and 426. Therefore, the non-additive constraint path computation module 118 prunes the links 422 and 426 (thus pruning paths B and D) without calculating the cost of paths B and/or D to the destination network element 410.

Thus, unlike typical path computation elements, in addition to pruning those links which do not meet the Boolean constraints, the non-additive constraint path computation module 118 prunes those links which have a worse path (e.g., a higher cost) to a common intermediary node than other links (and thus will never have a lower cost) without calculating the cost of the entire path. In other words, if the tentative paths converge at an intermediary network element before the destination network element (e.g., paths A, B, D, and F each converge at the network element 406), the non-additive constraint path computation module 118 prunes those links which have a worse path to that common network element. As previously described, typical path computation elements do not perform early pruning (e.g., they do not prune tentative links at a point of convergence, in addition to pruning the links which do not meet the Boolean constraints, without calculating the entire path to the destination). For example, instead of pruning the links 422 and 426 at the point the paths converge at the network element 406, a typical path computation element calculates the entire path to the destination 410 (e.g., path B is calculated through the network element 408 to the network element 410, and path D is calculated through the network element 409 to the network element 410). Once the entire path is calculated, the typical path computation element compares the costs of the path and eliminates those paths with a higher cost (e.g., paths B and D). Thus, it should be understood that the non-additive constraint path computation performed by the PCE engine 112 is faster and uses less computational resources (e.g., processing cycles, memory consumption, etc.) than typical path computation performed by typical path computation elements.

In certain cases, more than one tentative path may converge at a network element with the same cost. For example, if the cost from the network element 100 to the network element 406 was 3 for those paths going through the network element 402 and going through the network element 404, then those paths converge at the network element 406 with the same cost. According to one embodiment of the invention, the non-additive constraint path computation module 118 uses a multiple parameter callback comparison to determine tiebreakers (e.g., a multiple parameter equal cost multiple path (ECMP) comparison). For example, at block 216, the non-additive constraint path computation module 118 determines if more than one path has the same cost. If paths do not converge at any point prior to the destination, then flow moves to block 228, which will be described in greater detail later herein. However, if there are one or more paths that converge prior to the destination, then flow passes to block 218, which starts the process of, at the computational point of convergence (e.g., when the non-additive constraint path computation module 118 determines path convergence), determining which of those paths to select based on the multiple parameter callback.

At block 218, the non-additive constraint path computation module 118 determines if more than one of the converged path has the same lowest cost. If there is only one lowest cost path, that path is selected and flow moves to block 224. However, if there are more than one converged paths with the same lowest cost, flow moves to block 220. At block 220, the non-additive constraint path computation module 118 determines if more than one of the converged paths has the same minimum bandwidth parameter. If one of the tentative paths has a higher minimum bandwidth than the other paths, than that path is selected and flow moves to block 224. However, if more than one tentative path has the same highest minimum bandwidth, then flow moves to block 222. At block 222, the non-additive constraint path computation module 118 determines if more than one of the converged tentative paths has the same minimum hop count. If one of the tentative paths has a least number of hops to the network element where the paths have converged, then path is selected and flow moves to block 224. However, if more than one of the paths have the same hop count, then the non-additive constraint path computation module 118 randomly selects one of the those paths and flow moves to block 224.

At block 228, the fully computed tentative paths are compared if there is more than one path remaining to the destination. The fully computed tentative paths also use the multiple parameter callback according to one embodiment of the invention. Thus, the operations of the blocks 230, 232, and 234 are performed in a similar fashion as blocks 218, 220, and 222 described above. For example, at block 230, the non-additive constraint path computation module 118 determines if more than one of the tentative paths has the same lowest cost. If there is only one lowest cost path, that path is selected and flow moves to block 236. However, if there are more than one tentative paths with the same lowest cost, flow moves to block 232. At block 232, the non-additive constraint path computation module 118 determines if more than one of the tentative paths has the same minimum bandwidth parameter. If one of the tentative paths has a higher minimum bandwidth than the other paths, than that path is selected and flow moves to block 236. However, if more than one tentative path has the same highest minimum bandwidth, then flow moves to block 234. At block 234, the non-additive constraint path computation module 118 determines if more than one of the tentative paths has the same minimum hop count. If one of the tentative paths has a least number of hops to the destination, then that path is selected and flow moves to block 236. However, if more than one of the paths have the same hop count to the destination, then the non-additive constraint path computation module 118 randomly selects one of the those paths and flow moves to block 236.

After the computed path is chosen, at block 236 the computed path is transmitted to the signaling module (e.g., to the signaling module 140). Thus, referring to FIG. 1, at operation 7, the computed path is returned to the signaling protocol module(s) 140. Sometime later, at operation 8, the signaling protocol module(s) 140 signals the request with the computed path. For example, the signaling protocol module(s) 140 may reserve resources along the path to the destination.

Assuming the path was signaled, sometime later, at operation 9, the LSP is established through use of the label manager 150. While not shown in FIG. 1, the label manager 150 may interrelate with one or more routing tables in the control plane and/or data plane of the network element 100 to establish the LSP. For example, the label manager 150 may cause the label to be selectively downloaded to one or more label forwarding information bases (LFIBs) on one or more line cards of the network element 100. Additionally, the label manager 150 may interact with a routing information base (RIB) to, for example, determine layer 2 next hop routes for that LSP.

Figure 3:
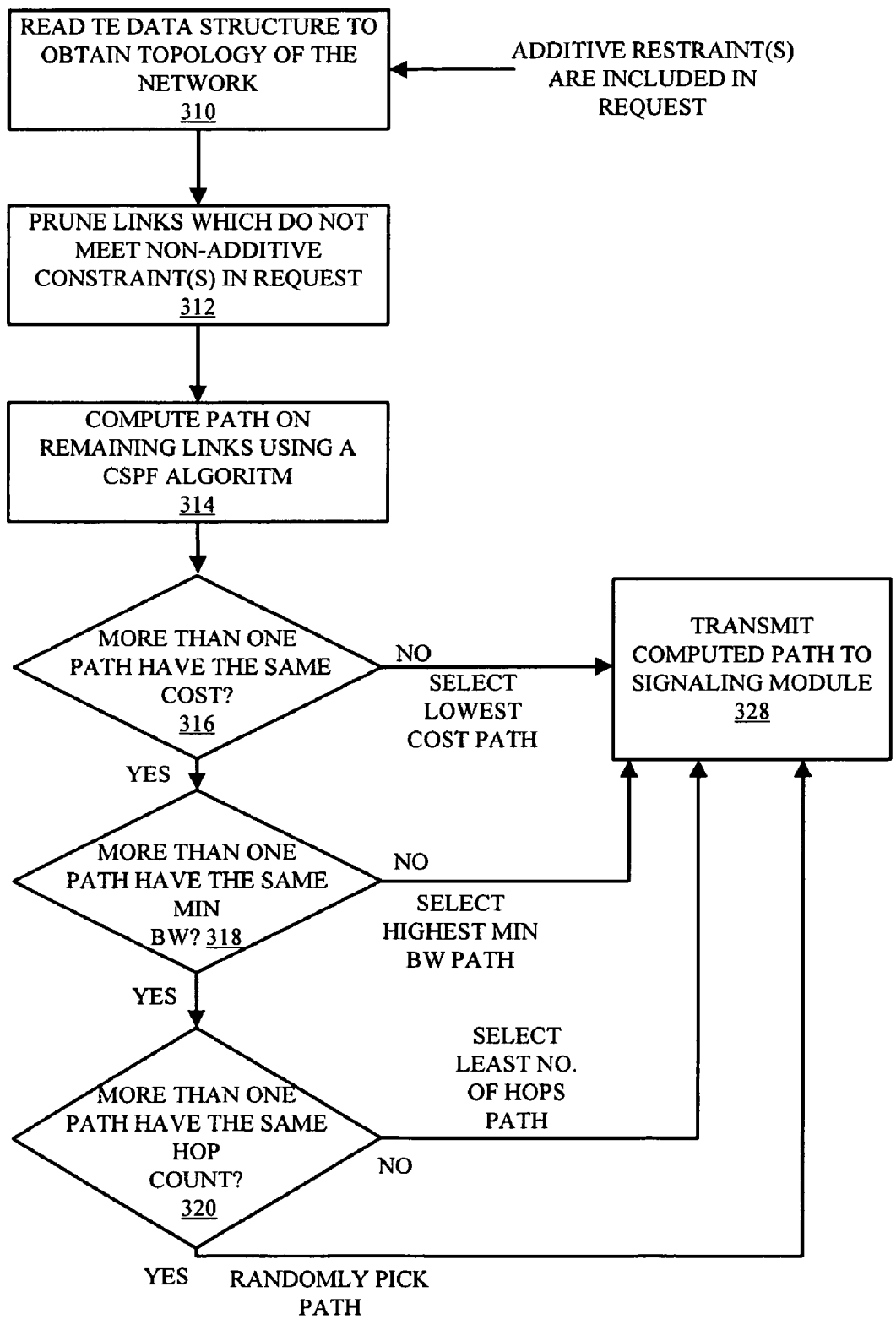
FIG. 3 is a flow diagram illustrating computing a path for the LSP upon determining that the request includes an additive constraint according to one embodiment of the invention.

Referring back to operations 5 and 6, if the additive constraint determination module 114 determines that an additive constraint is included in the request (there may also be Boolean constraints in the request), the additive constraint path computation module 119 performs the path computation. For example, the request may include as an additive constraint a number of hops limit to the destination (e.g., less than 4 hops to the destination). FIG. 3 is a flow diagram illustrating computing a path for the LSP upon determining that the request includes an additive constraint according to one embodiment of the invention. The operations of the FIG. 3 will be described with reference to the exemplary embodiment of FIG. 4. However, it should be understood that the operations of FIG. 3 can be performed by embodiments of the invention other than those discussed with reference to FIG. 4, and the embodiments discussed with reference to FIG. 4 can perform operations different than those discussed with reference to FIG. 3.

At block 310 (similar to block 210), the additive constraint path computation module 119 reads the traffic engineering data structure 116 to obtain the topology of the network, and flow moves to block 312. At block 312 (similar to block 212), the links which do not meet the non-additive constraints (e.g., Boolean constraints), if any, are pruned, and flow moves to block 314. Of course, it should be understood that the request may not include any Boolean constraints. At block 314, the PCE engine 112 computes the tentative path(s) to the destination based on the remaining links using a constrained shortest path first (CSPF) algorithm. According to one embodiment of the invention, calculating a path with an additive constraint requires evaluating the entire path to the destination. Thus, the additive constraint path computation module 119 does not prune tentative links before the last stage of node expansion (i.e., before the path reaches the destination). Thus, it should be understood that, when compared to processing non-additive constraint path requests, processing an additive constraint path request takes longer and requires more computational resources (e.g., processing cycles and memory). For example, processing a path request that includes an additive constraint is a non-deterministic polynomial time complete (NP-complete) problem (e.g., no polynomial-time algorithms are known to compute a path request that includes an additive constraint). In contrast, processing a path request that does not include an additive constraint (e.g., only includes Boolean constraints) is a polynomial-time problem.

According to one embodiment of the invention, the additive constraint path computation module 119 uses a multiple parameter callback comparison for tiebreaking (e.g., a multiple parameter ECMP comparison) if more than one path has equivalent lowest costs (the default path to select is the path with the lowest cost). Thus, at operation 316, the additive constraint path computation module 119 determines if more than one path has the same lowest cost. If there is only one path that has the lowest cost, flow moves to block 328 where that lowest cost path is transmitted to the signaling module(s) 140 (in a similar fashion as described with reference to block 236 of FIG. 2). If more than one computed tentative path to the destination has the same lowest cost, in block 318 the additive constraint path computation module 119 determines if more than one of the computed tentative paths has the same minimum bandwidth parameter. If one of the tentative paths has a higher minimum bandwidth than the other paths, than that path is selected and flow moves to block 328. However, if more than one computed tentative path has the same highest minimum bandwidth, then flow moves to block 320. At block 320, the additive constraint path computation module 119 determines if more than one of the tentative computed paths has the same minimum hop count. If one of the computed tentative paths has a least number of hops to the destination, then that path is selected and flow moves to block 328. However, if more than one of the paths have the same hop count to the destination, then the additive constraint path computation module 119 randomly selects one of the those paths and flow moves to block 328.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

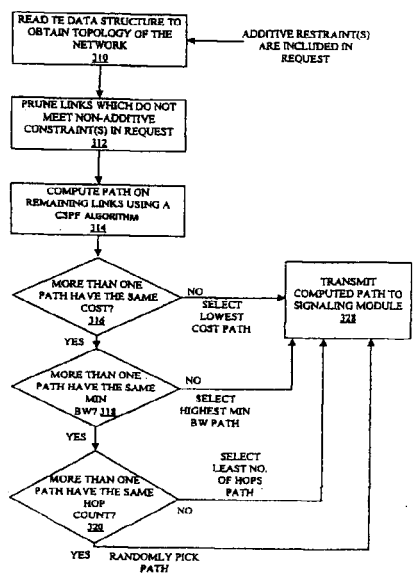

What is claimed is:

1. A computer implemented method for performing a dynamically runtime adjustable constrained shortest path first computation of a label switched path (LSP) from a first network element in a Multiprotocol Label Switching (MPLS) network acting as a source of the LSP to a second network element in the MPLS network acting as a destination of the LSP based on one or more traffic engineering constraints, wherein the MPLS network includes a plurality of other network elements acting as intermediaries between the source and the destination providing a plurality of paths between the source and destination, comprising:

the first network element storing a representation of the MPLS network's topology including a set of one or more link characteristics for each link in the MPLS network in a traffic engineering data structure in a non-transitory machine-readable storage medium of the first network element, wherein each link connects two of the network elements;

responsive to the first network element receiving a request to compute the LSP, the request including a set of one or more traffic engineering constraints, the first network element performing the following operations:
determining if the request includes at least one additive constraint;
if the request includes at least one additive constraint, performing the following,
if the request further includes one or more Boolean constraints, pruning each link that does not satisfy the Boolean constraints,
determining each possible path to the destination network element through the intermediary network elements,
calculating one or more feasible paths to the destination network element through at least some of the intermediary network elements which satisfy the additive constraint included in the request, wherein paths that do not satisfy the additive constraints are pruned at a point of failing the additive constraint,
selecting the feasible path with a smallest cost to the destination, and
if more than one feasible path has an equivalent smallest cost, performing an equal cost multiple path comparison to select one of the feasible paths for the requested LSP; and if the request does not include an additive constraint, performing the following,
  pruning each link that does not satisfy each of the set of traffic engineering constraints,
  pruning those links that are part of paths that converge at one of the intermediary network elements according to cost,
  calculating one or more paths to the destination according to cost, and
  if more than one path has the same cost, performing a multiple parameter equal cost multiple path comparison to select the path for the requested LSP.

2. The computer implemented method of claim 1, wherein performing the equal cost multiple path comparison includes randomly selecting one of the feasible paths for the requested LSP.

3. The computer implemented method of claim 1, wherein performing the multiple parameter equal cost multiple path comparison includes performing the following,
  selecting one or more of the paths with a highest minimum bandwidth characteristic,
  if more than one path has the same highest minimum bandwidth characteristic, selecting one or more paths with a lowest number of hops to the destination, and
  if more than one path has the same lowest number of hops to the destination, randomly selecting one of those paths for the requested LSP.

4. The computer implemented method of claim 1, wherein at least one of the additive constraints is a number of hops to the destination constraint.

5. The computer implemented method of claim 4, further comprising, wherein the calculating the path where the request includes at least one additive constraint includes adding link characteristics of those links comprising each path to the destination together.

6. The computer implemented method of claim 1, wherein calculating a path for a request including a non-additive constraint is faster than calculating a path for a request including at least one additive constraint.

7. The computer implemented method of claim 1, further comprising signaling the calculated path to the ones of the plurality of the network elements along the path and the destination network element.

8. The computer implemented method of claim 4, further comprising,
  determining whether a value of the number of hops additive constraint included in the request is greater than a total of the plurality of network elements in the MPLS network; and
  converting the request into a non-additive constraint if the value of the number of hops additive constraint is greater than the total of the plurality of network elements in the MPLS network.

9. A network element to perform a dynamically runtime adjustable constrained shortest path first (CSPF) calculation for a label switched path (LSP) to a destination based on a request which includes one or more constraints, comprising:
  software embodied on a non-transitory machine readable storage medium, the software including:
    a routing protocol module to exchange traffic engineering information of a Multiprotocol Label Switching (MPLS) network;
    a traffic engineering data structure coupled with the routing protocol module, the traffic engineering data structure to store the exchanged traffic engineering information of the MPLS network;
    a signaling protocol module to receive the request for the LSP, the request including one or more constraints; and
    a path computation element (PCE) engine coupled with the signaling protocol module and the traffic engineering data structure, the path computation engine including,
      an additive constraint determination module to determine if at least one additive constraint is included in the request,
      a non-additive constraint path computation module to compute a path for the LSP if the additive constraint determination module determines that no additive constraints were included in the request, and
      an additive constraint path computation module to compute the path for the LSP if the additive constraint determination module determines that at least one additive constraint is included in the request.

10. The network element of claim 9, wherein the non-additive constraint path computation module is to perform the following,
  prune each link that does not satisfy each of the constraints,
  prune those links that are part of paths that converge at an intermediary network element prior to the destination according to cost,
  calculate one or more paths to the destination according to cost, and
  if more than one path has the same cost, perform a multiple parameter equal cost multiple path comparison to select the path for the LSP.

11. The network element of claim 9, wherein the additive constraint path computation module is to perform the following,
  if the request includes one or more non-additive constraints, prune each link that does not satisfy those non-additive constraints,
  determine each path to the destination on those links remaining,
  calculate one or more feasible paths to the destination which satisfy the additive constraints included in the request, and
  if more than one feasible path has an equivalent smallest cost, perform a single parameter equal cost multiple path comparison to select one of the feasible paths for the requested LSP.

12. The network element of claim 10, wherein the multiple parameter equal cost multiple path comparison further includes the non-additive constraint path computation module to perform the following,
  select those paths that have a highest minimum bandwidth characteristic,
  if more than one path has the same highest minimum bandwidth characteristic, select those paths with a lowest number of hops to the destination, and
  if more than one path has the same lowest number of hops to the destination, randomly select one of those paths for the requested LSP.

13. The network element of claim 11, wherein the single parameter equal cost multiple path comparison further includes the additive constraint path computation module to randomly select one of the feasible paths for the requested LSP.

14. The network element of claim 13, wherein at least one of the additive constraints is a number of hops to the destination constraint.

15. The network element of claim 9, wherein the non-additive constraint path computation module is to calculate the path faster than the additive constraint path computation module.

16. The network element of claim 14, further comprising,
A hop limit constraint determination module to determine whether a value of the number of hops additive constraint included in the request is greater than a total number of network elements in the MPLS network, and convert the request into a non-additive constraint request if the value of the number of hops additive constraint is greater than the total of the network elements in the MPLS network.

17. A non-transitory machine-readable storage medium that provides instructions that, if executed by a processor, will cause said processor to perform operations for performing a dynamically runtime adjustable constrained shortest path first computation of a label switched path (LSP) from a first network element in a Multiprotocol Label Switching (MPLS) network acting as a source of the LSP to a second network element in the MPLS network acting as a destination of the LSP based on one or more traffic engineering constraints, wherein the MPLS network includes a plurality of other network elements acting as intermediaries between the source and the destination providing a plurality of paths between the source and destination, comprising:
    storing a representation of the MPLS network's topology including a set of one or more link characteristics for each link in the MPLS network in a traffic engineering data structure, wherein each link connects two of the network elements;
    receiving a request to compute the LSP, the request including a set of one or more traffic engineering constraints;
    determining if the request includes at least one additive constraint;
    if the request includes at least one additive constraint, performing the following,
        if the request further includes one or more Boolean constraints, pruning each link that does not satisfy the Boolean constraints,
        determining each possible path to the destination network element through the intermediary network elements,
        calculating one or more feasible paths to the destination network element through at least some of the intermediary network elements which satisfy the additive constraint included in the request, wherein paths that do not satisfy the additive constraints are pruned at a point of failing the additive constraint,
        selecting the feasible path with a smallest cost to the destination, and
        if more than one feasible path has an equivalent smallest cost, performing an equal cost multiple path comparison to select one of the feasible paths for the requested LSP; and
    if the request does not include an additive constraint, performing the following,
        pruning each link that does not satisfy each of the set of traffic engineering constraints,
        pruning those links that are part of paths that converge at one of the intermediary network elements according to cost,
        calculating one or more paths to the destination according to cost, and
        if more than one path has the same cost, performing a multiple parameter equal cost multiple path comparison to select the path for the requested LSP.

18. The non-transitory machine-readable storage medium of claim 17, wherein performing the equal cost multiple path comparison includes randomly selecting one of the feasible paths for the requested LSP.

19. The non-transitory machine-readable storage medium of claim 17, wherein performing the multiple parameter equal cost multiple path comparison includes performing the following,
    selecting one or more of the paths with a highest minimum bandwidth characteristic,
    if more than one path has the same highest minimum bandwidth characteristic,
        selecting one or more paths with a lowest number of hops to the destination, and
    if more than one path has the same lowest number of hops to the destination,
        randomly selecting one of those paths for the requested LSP.

20. The non-transitory machine-readable storage medium of claim 17, wherein at least one of the additive constraints is a number of hops to the destination constraint.

21. The non-transitory machine-readable storage medium of claim 20, further comprising, wherein the calculating the path where the request includes at at least one additive constraint includes adding link characteristics of those links comprising each path to the destination together.

22. The non-transitory machine-readable storage medium of claim 17, wherein calculating a path for a request including a non-additive constraint is faster than calculating a path for a request including at least one additive constraint.

23. The non-transitory machine-readable storage medium of claim 17, further comprising signaling the calculated path to the ones of the plurality of the network elements along the path and the destination network element.

24. The non-transitory machine-readable storage medium of claim 21, further comprising,
    determining whether a value of the number of hops additive constraint included in the request is greater than a total of the plurality of network elements in the MPLS network; and
    converting the request into a non-additive constraint if the value of the number of hops additive constraint is greater than the total of the plurality of network elements in the MPLS network.

* * * * *

UNITED STATES PATENT AND TRADEMARK OFFICE
CERTIFICATE OF CORRECTION

| | |
|---|---|
| PATENT NO. | : 7,990,877 B2 |
| APPLICATION NO. | : 12/121601 |
| DATED | : August 2, 2011 |
| INVENTOR(S) | : Lu |

It is certified that error appears in the above-identified patent and that said Letters Patent is hereby corrected as shown below:

On the Title Page, in Field (56), under "OTHER PUBLICATIONS", in Column 2, Line 6, delete "Routeing" and insert -- Routing --, therefor.

On the Title Page, in the Figure, in Box "314", Line 3, delete "ALGORITM" and insert -- ALGORITHM --, therefor.

In Fig. 3, Sheet 3 of 5, in Box "314", Line 3, delete "ALGORITM" and insert -- ALGORITHM --, therefor.

In Column 2, Line 24, delete "invention" and insert -- invention. --, therefor.

In Column 7, Line 43, delete "(e.g,." and insert -- (e.g., --, therefor.

In Column 13, Line 6, in Claim 16, delete "A hop" and insert -- a hop --, therefor.

Signed and Sealed this
Twenty-seventh Day of December, 2011

David J. Kappos
*Director of the United States Patent and Trademark Office*

(12) United States Patent
Lu

(10) Patent No.: US 7,990,877 B2
(45) Date of Patent: Aug. 2, 2011

(54) METHOD AND APPARATUS FOR DYNAMICALLY RUNTIME ADJUSTABLE PATH COMPUTATION

(75) Inventor: Wenhu Lu, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 353 days.

(21) Appl. No.: 12/121,601

(22) Filed: May 15, 2008

(65) Prior Publication Data
US 2009/0285101 A1    Nov. 19, 2009

(51) Int. Cl.
*H04L 12/26* (2006.01)
(52) U.S. Cl. .................................. 370/238; 370/395.21
(58) Field of Classification Search .................. 370/238, 370/395.21
See application file for complete search history.

(56) References Cited

U.S. PATENT DOCUMENTS

| 6,301,244 | B1 * | 10/2001 | Huang et al. | 370/351 |
| 6,956,821 | B2 * | 10/2005 | Szviatovszki et al. | 370/237 |
| 7,324,453 | B2 | 1/2008 | Wu et al. | |
| 2003/0118024 | A1 * | 6/2003 | Lee et al. | 370/395.1 |
| 2007/0280117 | A1 * | 12/2007 | Katz et al. | 370/238 |

OTHER PUBLICATIONS

Arshad, Muhammad Taimur, "Routing Traffic Reliably (RTR) A CSPF Algorithm," Mar. 26, 2003, 8 pages.
Liu, Gang and Ramakrishnan, K.G., "A*Prune: An Algorithm for Finding K Shortest Paths Subject to Multiple Constraints," IEEE INFOCOM 2001, 0-7803-7016-3/01 © 2001 IEEE, pp. 743-749.
Jabbari, Bijan, et al., "On Constraints for Path Computation in Multi-layer Switched Networks," IEICE Trans. Commun., vol. Exx-B, No. xx XXXX 200x, Final manuscript received Mar. 9, 2007, pp. 1-6.
"Information Technology—Telecommunications and Information Exchange between Systems—Intermediate System to Intermediate System Intra-domain Routeing Information Exchange Protocol for use in Conjunction with the Protocol for Providing the Connection-less-mode Network Service (ISO 8473)," International Standard, ISO/IEC 10589, Second Edition, Nov. 15, 2002, Reference No. ISO/IEC 10589:2002(E), Geneva, Switzerland, pp. 1-210.
"Implementing a Constraint-based Shortest Path First Algorithm in Intelligent Optical Networks," MAHI Networks, Copyright © 2003 Mahi Networks, Inc., pp. 1-11.
Farrel, A., et al., "A Path Computation Element (PCE)-Based Architecture," Request for Comments (RFC) 4655, Aug. 2006, pp. 1-40.
Moy, J., "OSPF Version 2," Request for Comments: 2328, Apr. 1998, pp. 1-244.

* cited by examiner

*Primary Examiner* — Huy D Vu
*Assistant Examiner* — Benjamin Lamont
(74) *Attorney, Agent, or Firm* — Blakely, Sokoloff, Taylor & Zafman LLP

(57) ABSTRACT

A method and apparatus for performing a dynamically runtime adjustable constrained shortest path first (CSPF) computation of a label switched path (LSP) is described. In one embodiment of the invention, a network element acting as a source of the LSP receives a request to compute the LSP which includes one or more traffic engineering constraints. If the request includes at least one additive constraint, the network element performs a CSPF calculation. If the request does not include an additive constraint, the network element prunes each link that does not satisfy each of the constraints, and prunes those links whose paths converge at an intermediary network element according to cost, calculates a path to the destination according to cost. Other methods and apparatuses are also described.

24 Claims, 5 Drawing Sheets